United States Patent [19]

Taylor

[11] Patent Number: 5,028,120
[45] Date of Patent: Jul. 2, 1991

[54] DAY-NIGHT REAR VIEW MIRROR

[76] Inventor: G. Brandt Taylor, 36 Barnes Hill Rd., Berlin, Mass. 01503

[21] Appl. No.: 295,844

[22] Filed: Jan. 11, 1989

[51] Int. Cl.⁵ .......................... G02B 26/02; G02B 5/08
[52] U.S. Cl. .................................... 350/266; 350/283; 350/631; 350/642
[58] Field of Search ............... 350/605, 610, 612, 623, 350/625, 633, 277, 279, 280, 283, 278, 281, 637, 267–271, 276 R–277, 283, 284, 486, 487, 606, 610, 312, 319, 320; 74/502.1; 40/592, 564; 362/135–144, 21, 351

[56] References Cited

U.S. PATENT DOCUMENTS

| | | |
|---|---|---|
| 1,542,318 | 6/1925 | Pollock . |
| 1,628,218 | 5/1927 | Beauchamp . |
| 1,776,496 | 9/1930 | Eiland . |
| 2,118,962 | 5/1938 | Barron . |
| 2,307,532 | 1/1943 | Murphy . |
| 2,558,848 | 7/1951 | Harrison . |
| 3,404,615 | 10/1968 | Proffitt, Jr. .................... 350/267 |
| 3,542,455 | 11/1970 | Jensen ........................ 350/280 |
| 3,603,672 | 9/1971 | Bastide ....................... 350/283 |
| 3,695,681 | 10/1972 | Dockery ...................... 350/312 |
| 3,870,404 | 3/1975 | Wilson et al. ................ 350/281 |
| 3,914,027 | 10/1975 | Caron ......................... 350/267 |
| 3,985,429 | 10/1976 | Fleischer .................... 350/288 |
| 4,093,352 | 6/1978 | Pisar .......................... 350/267 |
| 4,236,360 | 12/1980 | Parrier et al. ................ 350/312 |
| 4,536,061 | 8/1985 | Nishimura ................... 350/267 |
| 4,623,222 | 11/1986 | Itoh et al. .................... 350/283 |
| 4,697,883 | 10/1987 | Suzuki et al. ................ 350/283 |
| 4,726,656 | 2/1988 | Schofield et al. ............ 350/278 |
| 4,917,824 | 4/1990 | Lynam et al. ................ 350/266 |

*Primary Examiner*—Bruce Y. Arnold
*Assistant Examiner*—Thong Nguyen
*Attorney, Agent, or Firm*—Blodgett & Blodgett

[57] ABSTRACT

A day-night mirror assembly for a motor vehicle having a housing with a front opening, a first sheet of transparent material at the opening and second sheet which is located behind the first sheet and which has a first light reflective surface which faces the opening. A third sheet having a second light reflecting surface which differs in light reflectivity from the first light reflective surface is located within the housing for movement between an inactive position to an active position in which the third sheet is located between the first and second sheets and a second light reflective surface faces the opening in the housing. The third sheet is selectively positioned in either the active position or the inactive position by means of an actuator which is manually operated from outside of the housing.

14 Claims, 3 Drawing Sheets

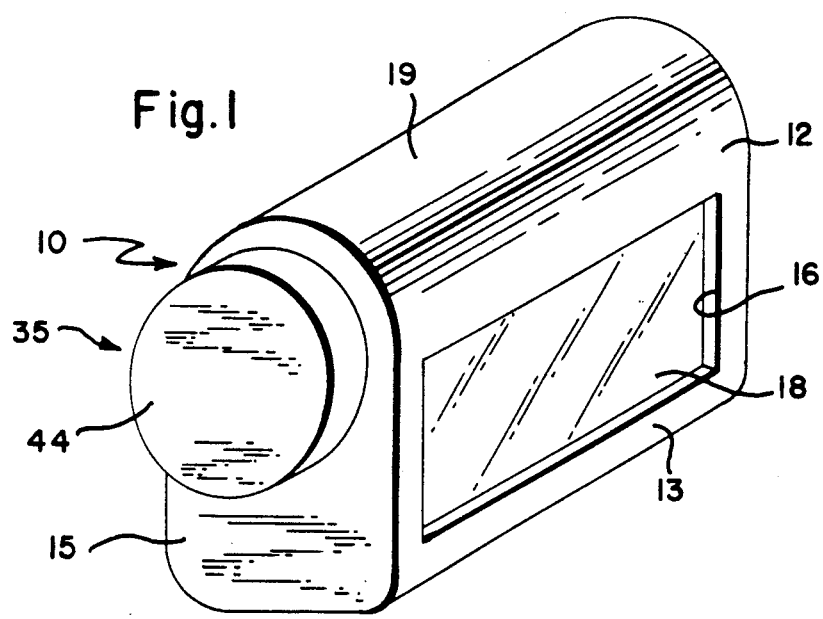
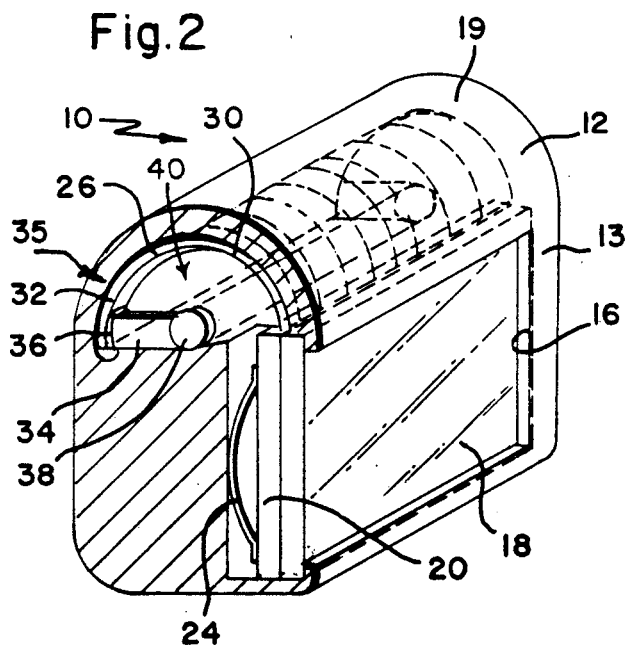
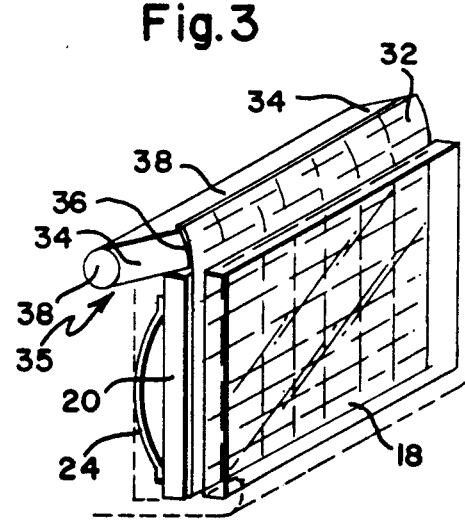
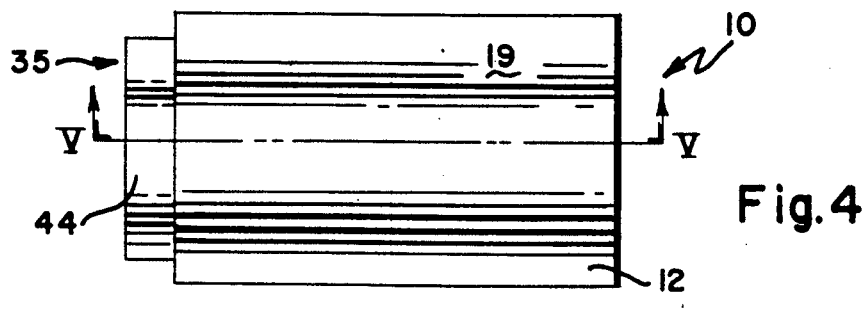

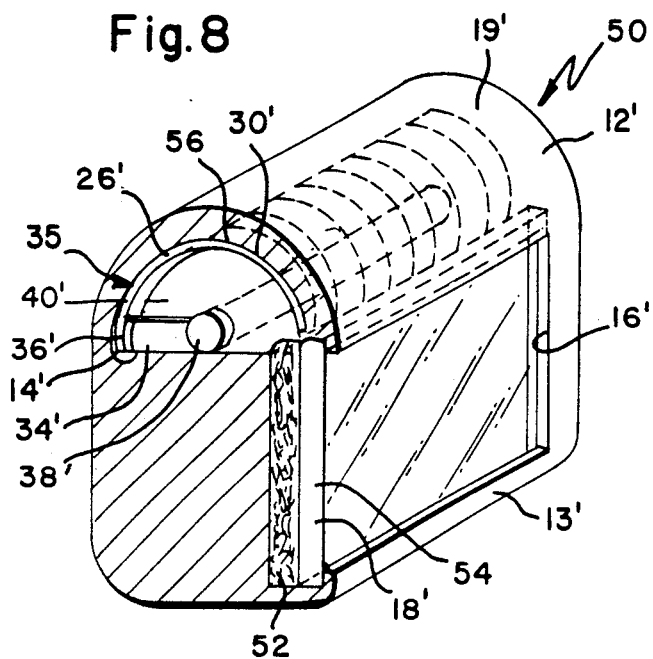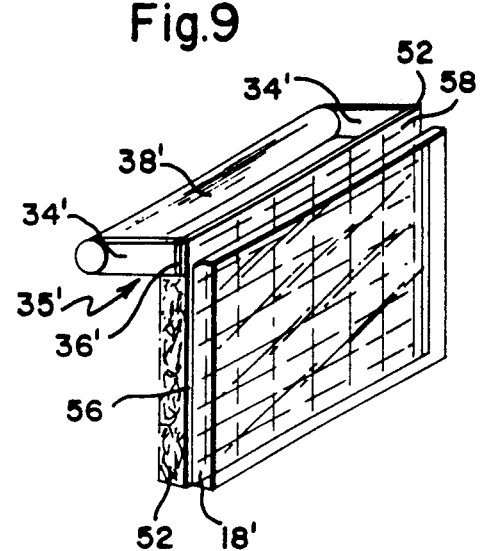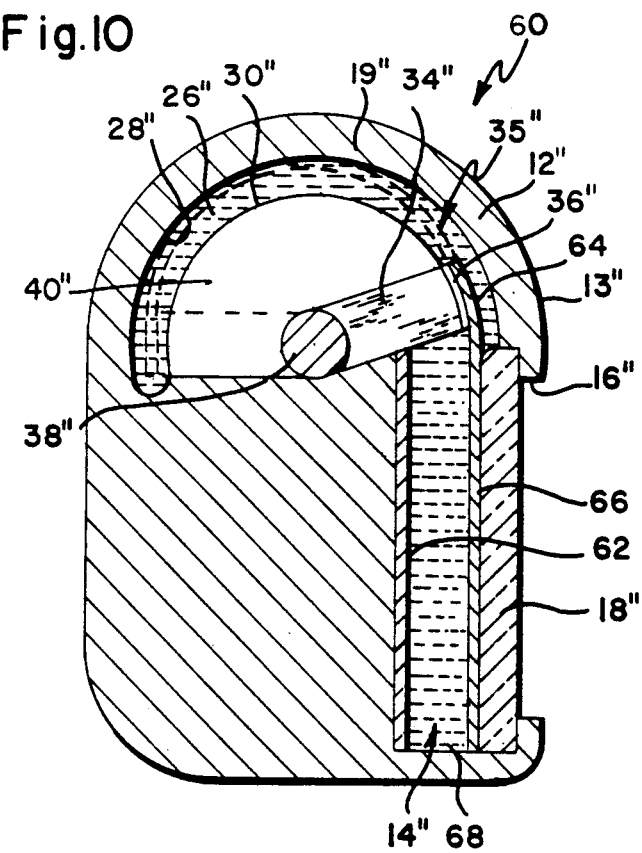

5,028,120

DAY-NIGHT REAR VIEW MIRROR

BACKGROUND OF THE INVENTION

The present invention is generally directed to a day-night rear view mirror for a motor vehicle. Day-night rear view assemblies are well known in the motor vehicle art. These provide rear viewing by the occupant of the motor vehicle in either high light or low light conditions. The mirror assembly is adjustable by the occupant for selectively presenting a highly light reflective surface to the viewer during periods of daylight and a relatively low reflective surface during periods of low light, or at night. The relatively low reflectivity minimizes the glare which is perceived by the eyes of the occupant of the vehicle from the headlights of a following vehicle. The headlight glare from a following vehicle is bothersome to the occupant of the lead vehicle and also creates an unsafe driving condition.

Many mirror assembly designs have been utilized to produce the day-night mirror effect. One design which has been used extensively, utilizes a mirror which has a triangular cross-section. This causes the mirror to produce two different images. Since about ten per cent of light rays normal to a glass surface are reflected by it, the image which is produced by that surface has a character which is appropriate for use as a rear view mirror for a motor vehicle at night. The remaining ninety percent of the light rays, which pass through the surface of the glass, are reflected by the silvered backing of the mirror. Since the mirror has a triangular cross-section, the rays of the image which is produced by the front surface of the glass diverge from the rays of the image which is produced by the silvered back of the glass. By the same token, images from two different points or sources of light converge to a single point, i.e. the occupant of the motor vehicle. When the mirror assembly is mounted inside a motor vehicle, the roof of the vehicle is the point source for one image. Since there is no light source in the roof of the vehicle, only one image is visible to the operator. Therefore, by adjusting the position or tilt of the mirror with respect to the operator, the operator views either an image from the light which is reflected from the surface of the glass, or an image which is produced by the light which passes through the surface of the glass and is reflected by the silvered back of the glass.

The mirror assembly which utilizes a movable triangular mirror or prism is limited to use within the vehicle. If this type of mirror is used on the exterior of the vehicle, or in a convertible with the roof down, two images are visible to the operator at the same time. For example, as the operator drives down a street which is lit by street lights with cars following behind, the image of the street light is viewed by the operator as overlapping the image, or images of car headlights which are behind the operator.

In an attempt to solve the problems described above, a day-night rear view mirror assembly has been developed which includes a transparent glass panel which is positioned in a housing between a mirror and the area to be viewed. The mirror is surrounded by a movable opaque shade having a window formed there through that may be brought into and out of registry with the light reflective surface of the mirror. When the mirror assembly is in the night viewing position, the window is out of registry with the mirror which is covered by the opaque shade material. Images such as headlights of following vehicles from the rear of the vehicle are reflected by the plain glass panel in front of the mirror. Since the light reflectivity of the plain glass panel is much lower than the light reflectivity of the mirror, the reflected image, which is viewed by the vehicle occupant, is of greatly diminished intensity. When the mirror assembly is in the daylight position, the window is in register with the mirror so that images from the rear of the vehicle pass through the transparent glass panel and are reflected by the mirror for viewing by the vehicle occupant.

Although the above described day-night rear view mirror enable the mirror to be used from a position outside of the vehicle, it has been less than satisfactory in actual practice. For example, during daytime viewing, a faint second image is perceived by the viewer which is offset from the principle image which is reflected by the mirror. This represents an annoying condition to the operator of the vehicle and tends to be distracting, which is not conducive to complete safety. These and other difficulties experienced with the prior art day-night rear view mirror assemblies have been obviated by the present invention.

It is, therefore, a principle object of the invention to provide a day-night rear view mirror assembly which is selectively actuated for providing an attenuated image for nighttime viewing and a clear, bright image during daytime viewing without any annoying double image.

Another object of this invention is the provision of a day-night rear view mirror in which both the bright, daytime image and the attenuated nighttime image are clearer than those of prior art rear view mirrors and without a double image.

A further object of the present invention is the provision of a day-night rear view mirror which is considerably simpler in construction than previous day-night mirrors and easier to use.

With these and other objects in view, as will be apparent to those skilled in the art, the invention resides in the combination of parts set forth in the Specification and covered by the claims appended hereto.

SUMMARY OF THE INVENTION

In general, the invention consists of a day-night rear view mirror assembly for a motor vehicle having a housing with a window or opening which leads to a chamber within the housing. A sheet of transparent material is located at the opening and a first light reflective surface is located behind the sheet of transparent material. A movable sheet of light reflective material is mounted in the housing so that it may be moved between the transparent sheet and the first light reflective surface, or withdrawn from that position between the transparent sheet and the first light reflective surface. The movable sheet has a second light reflective surface which has a significantly different light reflectivity than that of the first light reflective surface. When the surface with the lower light reflectivity is in register with the transparent sheet, an attenuated image is perceived by the operator of the vehicle for nighttime viewing. When the surface with the higher light reflectivity is in register with the transparent sheet, the vehicle operator perceives a bright image for daytime viewing.

BRIEF DESCRIPTION OF THE DRAWINGS

The character of the invention, however, may be best understood by reference to one of its structural forms, as illustrated by the accompanying drawings in which:

FIG. 1 is a perspective view of a day-night rear view mirror assembly embodying the principles of the present invention, FIG. 2 is a view similar to FIG. 1 with one end wall broken away thereby exposing internal features of the assembly and showing the assembly in the daytime viewing mode, FIG. 3 is a fragmentary perspective view of the reflective elements of the invention shown in the nighttime operating mode, FIG. 4 is a planned view of the day-night rear view mirror assembly of the present invention, FIG. 8 is a view which is similar to FIG. 2, showing a first modification, FIG. 9 is a view which is similar to FIG. 3, showing the modification of FIG. 8, and FIG. 10 is a view which is similar to FIG. 7, showing a second modification.

DESCRIPTION OF THE PREFERRED EMBODIMENT

Figure 5:
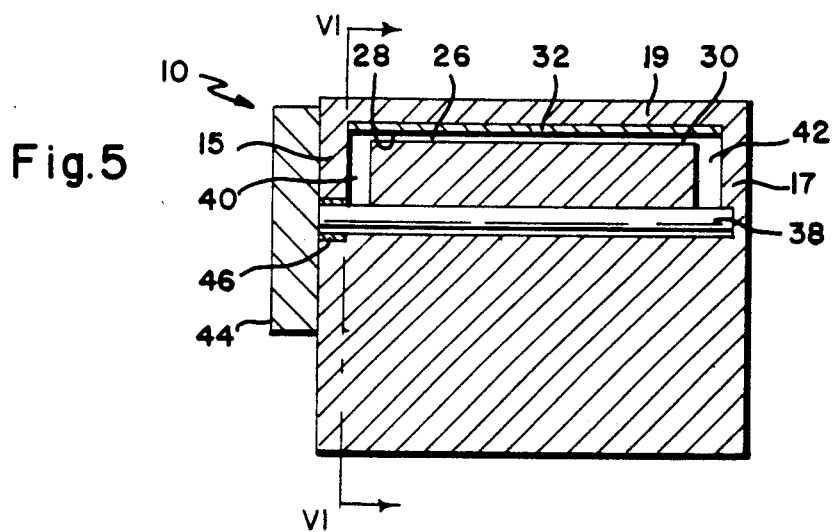
FIG. 5 is a vertical cross-sectional view of the assembly taken along the line V—V of FIG. 4.

Referring first to FIGS. 1–7, the preferred day-night mirror assembly of the present invention is generally indicated by the reference numeral 10 and comprises a housing 12 having a front wall 13, end walls 15 and 17 and a top wall 19. The housing 12 includes a chamber 14 and a front opening 16 in the front wall 13. A first sheet of transparent material 18 extends across the front opening 16 and forms a seal between the opening 16 and the chamber 14. A second sheet 20 of transparent material is located behind the first sheet 18 and has a first light reflective surface 22 which faces the opening 16. The sheet 20 in the preferred embodiment is a conventional mirror in which the highly light reflective backing of the mirror constitutes the first light reflective surface. The second sheet 20 is biased against the first sheet 18 by a pair of springs 24.

The upper portion of the chamber 14 is in the form of an arcuate channel 26 which is located beneath the top wall 19. The channel 26 is defined by an upper concave surface 28 and a lower convex surface 30, see also FIGS. 6 and 7. A third sheet 32 is located in the chamber 14 and has a second light reflective surface 33. The light reflectivity of the surface 33 is substantially less than the light reflectivity of the surface 22. One end of the sheet 32 is fixed to a cross bar 36 which extends across the length of the chamber 14 and is supported by a pair of arms 34. The arms 34 are affixed to a shaft 38 which is journaled in the end walls 15 and 17, see particularly FIG. 5. The arms 34 are located in spaces 40 and 42 which are located behind the end walls 15 and 17, respectively. One end of the shaft 38 extends through the end wall 15 and is fixed to a turning knob 44 which is located outside of the housing 12. The cross bar 36, arms 34, shaft 38, and turning knob 44 constitute actuating means, generally indicated by the reference numeral 35, for moving the third sheet 32 between the inactive position shown in FIG. 2 to the active position shown in FIG. 3. The central longitudinal axis of the shaft 38 is parallel with the sheets 18, 20, and 32. Rotation of the turning knob 44 causes the shaft 38 to rotate about its central longitudinal axis for moving the arms 34 between the rear position shown in FIGS. 2 and 6 and the forward position shown in FIGS. 3 and 7. When the arms 34 are in their rear position, the third sheet 32 is in its inactive position within the arcuate channel 26.

Figure 6:
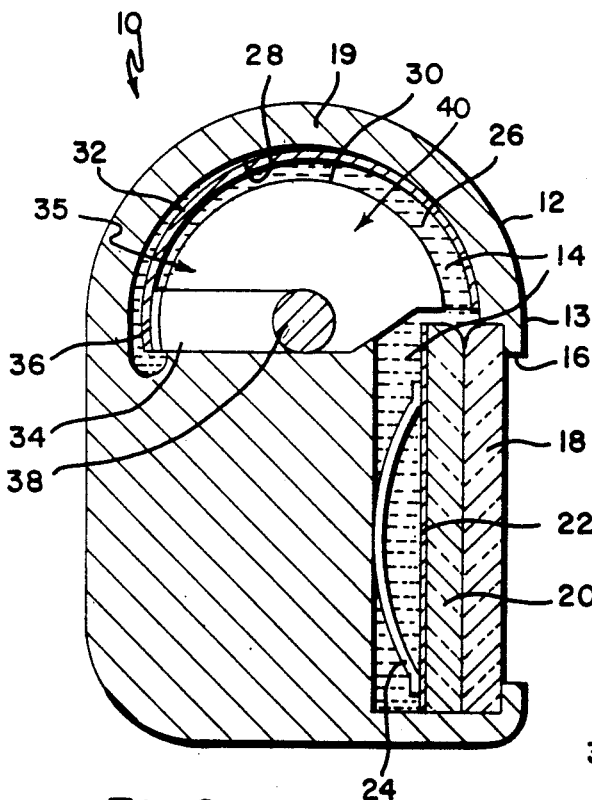
FIG. 6 is a vertical cross-sectional view of the assembly taken along the line VI—VI of FIG. 5 and showing the assembly in the daytime viewing mode.

The sheet 32 is made of a bendable and resilient material which enables the sheet to conform to the concave upper surface 28 as shown in FIG. 6. When the arms 34 are moved to the forward position shown in FIG. 7 by rotating the turning knob 44, the sheet 32 is moved to its active position between the sheets 18 and 20 by displacing the sheet 20 rearwardly against the springs 24. When the sheet 32 is in its active position between the sheets 18 and 20, sheet 32 is planar and the second light reflective surface 33 faces toward the opening 16. The surface 33 combines with the sheet 18 to effectively form a mirror having low light reflective qualities for nighttime viewing.

Figure 7:
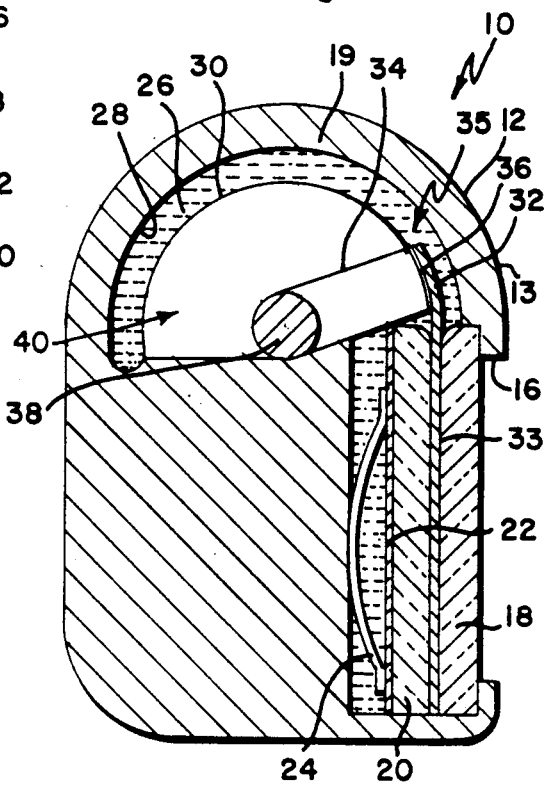
FIG. 7 is a view which is similar to FIG. 6 showing the assembly in the nighttime viewing mode.

The chamber 14 contains a translucent lubricating liquid such as mineral oil. The oil provides lubrication for all of the moving parts in the assembly to enhance the operation of the assembly and to extend its useful life. The oil also enhances the clarity of both the daytime image which is produced by the first light reflective surface 22 and the nighttime image which is produced by the light reflective surface 33. Since the sheet 20 is biased against the sheet 18 by the springs 24, there is no air gap between the light reflective surface 22 and the outer surface of the sheet 18 when the sheet 32 is in the inactive position as shown in FIG. 6 and there is no air gap between the light reflective surface 33 and the outer surface of the sheet 18 when the sheet 32 is in the active position as shown in FIG. 7. The elimination of an any air gaps in the light transmitting median portions of the light reflective mediums insures that no double image will be seen by the observer in the motor vehicle in either the nighttime mode or the daytime mode of the day-night mirror assembly of the present invention. The end of the shaft 38 which is attached to the turning knob 44 extends through a sealing bushing 46 in the end wall 15. The seal 46 and the tight fit of the sheet 18 at the opening 16 provide a complete seal against leakage of oil from the chamber 14 to the outside. The first light reflective surface 22 can have low light reflective qualities and the second light reflective surface 33 can have higher light reflective qualities. When this is the case, the third sheet 32 will be in the inactive position shown in FIG. 6 for nighttime viewing and in the active position shown in FIG. 7 for daytime viewing.

Referring to FIGS. 8 and 9, there is shown a first modified day-night mirror assembly generally indicated by the reference numeral 50. The assembly 50 includes a housing 12' which is identical to the housing 12 and actuating means 35' which is identical to actuating means 35. The same reference numerals are used for identical portions of the assemblies 10 and 50 except that the elements of assembly 50 are identified with a prime.

The space behind the first sheet of transparent material 18' is filled with a second sheet 52 which consists of a resilient compressible mat of dark fibers. The sheet 52 is in a compressive state against the first sheet 18'. The sheet 52 provides a first light reflective surface 54 which faces the opening 16' and which has a relatively low light reflective characteristic. A third sheet 56 is located within the chamber 14'. One end of the sheet 56 is fixed to a cross-bar 36'. The sheet 56 has a springy nature so that it occupies the channel 26 in a curved condition when the arms 34' are in their rearward position as shown in FIG. 8. When the arms 34' are moved to the forward position as shown in FIG. 9, the sheet 56 extends in a flat state behind the first sheet 18' and the second sheet 52 and is biased against the sheet 18' by the sheet 52. The sheet 56 has a second reflective surface 58 which faces the opening 16' when the sheet 56 is between the sheets 18' and 52 for daytime viewing. The light reflective characteristic of surface 58 is substantially greater than that of the surface 54. When the sheet 56 is in the inactive position in the channel 26 as shown in FIG. 8, the images which are observed by the operator of the vehicle for nighttime operation are provided by the surface 54 of the sheet 52 which faces the front opening 16'. The chamber 14' contains a lubricating liquid such as mineral oil.

Referring to FIG. 10, there is shown a second modified day-night mirror assembly generally indicated by the reference numeral 60. The assembly 60 includes a housing 12'' which is identical to the housing 12', an actuating means 35'' which is identical to the actuating means 35. The same reference numerals are used for identical portions of the assemblies 10 and 50 except that the elements of assembly 60 are identified with a double prime.

The second day-night mirror assembly 60 includes a first reflective surface 62 which is located within the chamber 14''. The surface 62 is spaced from and faces the first sheet of transparent material 18'', the space between the surface 62 and the sheet 18'' is filled with a translucent liquid such as mineral oil 68. The light refraction index of the mineral oil in the space between the surface 62 and the sheet 18'' is close to that of the sheet 18'' and thereby constitutes an extension of the transparent medium of the sheet 18''. The light reflective surface 62, the oil 68 and the sheet combine to effectively constitute a mirror. The second sheet 64 is located within the chamber 14''. One end of the sheet 64 is fixed to cross-bar 36'' so that it can be moved from an inactive position shown in dotted lines in FIG. 10 to an active position shown in full lines within the space between the first light reflective surface 62 and the first sheet 18''. Sheet 64 is bendable and resilient and is biased to assume a planar shape. When the sheet 64 occupies the channel 26'' in its inactive position, it is forced into a curved shape by the upper concave surface 28. When the arms 34'' are moved to the forward position, sheet 64 extends along the back side of the first sheet 18'' and due to its springy nature is biased against the sheet 18'', as shown in FIG. 10. The sheet 64 has a second light reflective surface 66 which faces the opening 16'' when the sheet 64 in its active position against the sheet 18''. The light reflective characteristic of the surface 62 is substantially greater than that of the surface 66. When the sheet 64 is in the inactive position shown in dotted lines in FIG. 10, the light reflective surface 62 combines with the oil 68 and sheet 18'' to form a mirror for daytime use which has high light reflective characteristics. When the sheet 64 is in the active position shown in full lines in FIG. 10, the light reflective surface 66 combines with the transparent sheet 18'' to form a mirror having low light reflective characteristics for nighttime use. The use of mineral oil insures that no air gap exists between either light reflective surface 66 and 62 so that no second image is perceived by the viewer in either state of the mirror assembly.

The first light reflective surface 62 can have low light reflective qualities and the second light reflective surface 66 can have high light reflective qualities. When this is the case, the second modification 60 is used for daylight viewing when the sheet 64 is in the active position shown in full lines and nighttime viewing when the sheet 64 is in its inactive position shown in dotted lines in FIG. 10. Clearly, minor changes may be made in the form and construction of the invention without departing from a material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A day-night mirror assembly for a motor vehicle, said mirror assembly comprising:
   (a) a housing having a chamber, a front wall, and an opening in said front wall,
   (b) a first sheet of transparent material at said opening,
   (c) a second sheet which is located behind said first sheet, said second sheet having a first light reflective surface which faces said opening and said first sheet,
   (d) means for biasing said second sheet against said first sheet,
   (e) a third sheet which is located within said chamber for movement between an active position in which said third sheet is located between said first and second sheets and an inactive position in which third sheet is not located between said first and second sheets, said third sheet having a second light reflective surface which faces said opening when said third sheet is in said active position, said second light reflective surface differing in light reflectivity from said first light reflective surface, and
   (f) an actuator for selectively positioning said third sheet in either said active position or in said inactive position.

2. A day-night mirror assembly as recited in claim 1, wherein said first light reflective surface has a higher light reflectivity than that of said second light reflective surface.

3. A day-night mirror assembly as recited in claim 1, wherein said first light reflective surface has a lower light reflectivity than that of said second light reflective surface.

4. A day-night mirror assembly as recited in claim 1, wherein said biasing means is a spring which is located in said chamber.

5. A day-night mirror assembly as recited in claim 1, wherein said second sheet is a compressible resilient material which is in compression against said first sheet.

6. A day-night mirror assembly as recited in claim 5, wherein said compressible resilient material is a mat of dark fibers.

7. A day-night mirror assembly as recited in claim 1, wherein each of said first and second sheets is planar and said third sheet is flexible and, wherein said housing has an accurate channel which is defined by an upper concave surface and a lower convex surface, said third sheet lying within said channel in a curved condition against said upper concave surface when said third sheet is in its inactive position.

8. A day-night mirror assembly as recited in claim 1, wherein said actuator comprises:
   (a) a shaft which is mounted on said housing for rotation about its central longitudinal axis within said chamber, said axis being parallel with said sheets,
   (b) an arm having a first end which is fixed to said shaft and a second end which is fixed to one end of said third sheet, and
   (c) a knob which is fixed to one end of said shaft and which is located outside of said housing.

9. A day-night mirror assembly as recited in claim 1, wherein said assembly further comprises a translucent liquid within said chamber so that said second and third sheets are immersed in said liquid.

10. A day-night mirror assembly for a motor vehicle, said mirror assembly comprising:
   (a) a housing having a chamber, a front wall, and an opening to said chamber in wall front side,
   (b) a first sheet of transparent material at said opening,
   (c) a first light reflective surface in said chamber which is spaced from and which faces said opening and said first sheet,
   (d) a translucent liquid between said first sheet and said first light reflective surface,
   (e) a second sheet which is located in said chamber for movement between an inactive position in which said second sheet is outside of a space between said first sheet and said first light reflective surface and an active position in which said second sheet is between said first sheet and said first reflective surface, said second sheet having a second light reflective surface which faces said opening when said second sheet is in said active position, said second light reflective surface differing in light reflectivity from said first reflective surface, and
   (f) an actuator for selectively positioning said second sheet in either said active position or in said inactive position.

11. A day-night mirror assembly as recited in claim 10, wherein said second sheet is bendable and resilient so that said second sheet is biased against said first sheet when said second sheet is in said active position.

12. A day-night mirror assembly as recited in claim 10, wherein said first light reflective surface has a higher light reflectivity than that of said second light reflective surface.

13. A day-night mirror assembly as recited in claim 10, wherein said first light reflective surface has a lower light reflectivity than that of said second light reflective surface.

14. A day-night mirror assembly as recited in claim 10, wherein said liquid is a lubricating oil.

* * * * *